(12) United States Patent
Morgan

(10) Patent No.: US 6,378,153 B1
(45) Date of Patent: Apr. 30, 2002

(54) MULTIFUNCTIONAL SHOVEL ATTACHMENT FOR AN ICE AXE

(76) Inventor: Richey Morgan, P.O. Box 903, Olalla, WA (US) 98359

( * ) Notice: Subject to any disclaimer, the term of this patent is extended or adjusted under 35 U.S.C. 154(b) by 40 days.

(21) Appl. No.: 09/652,000

(22) Filed: Aug. 31, 2000

(51) Int. Cl.[7] .................................................. A01B 1/20
(52) U.S. Cl. ............................................. 7/116; 294/51
(58) Field of Search ............................. 294/49, 51, 52, 294/53.5, 54.5, 59; 7/114, 116, 158, 159; 30/122, 308.1, 308.3

(56) References Cited

U.S. PATENT DOCUMENTS

| | | | | |
|---|---|---|---|---|
| 368,013 A | * | 8/1887 | Schad | 294/51 |
| 827,898 A | * | 8/1906 | Wiener | 7/116 |
| 1,326,108 A | * | 12/1919 | Seelye | 294/51 |
| 2,665,434 A | * | 1/1954 | Saunders | 7/114 |
| 3,334,939 A | * | 8/1967 | Bonic | 294/51 |
| 4,475,756 A | * | 10/1984 | Reading | 294/51 |
| 5,345,635 A | * | 9/1994 | Morgan | 294/51 X |

* cited by examiner

*Primary Examiner*—Johnny D. Cherry
(74) *Attorney, Agent, or Firm*—Norman Rainer

(57) ABSTRACT

A shovel blade attachment for a climber's ice axe has a centered slot that can accommodate the head of the ice axe so as to produce a trenching tool. A receiving pocket on the upper surface of the blade attachment secures the head of the ice axe, and a threaded bolt penetrates the pocket to lock the head in place. In an alternative manner of use, the spike extremity of the ice axe may instead engage the blade by way of the receiving pocket and bolt to produce a shovel tool.

9 Claims, 2 Drawing Sheets

MULTIFUNCTIONAL SHOVEL ATTACHMENT FOR AN ICE AXE

BACKGROUND OF THE INVENTION

1. Field of the Invention

This invention relates to mountaineering equipment and more particularly concerns a shovel blade attachment adapted to be affixed to a climber's ice axe.

2. Description of the Prior Art

Climbing in snow is a fundamental part of mountaineering. Climbers like snow for several reasons: a) it makes many climbs easier by providing a pathway over brush and other obstacles on the approach hike, b) it reduces the danger of loose rock on the ascent, and c) it brings beauty to the mountains and conceals the impact of people upon the environment.

Snow is a complex medium that shows up in many forms that continually change, making snow travel considerably more difficult than trail hiking or rock climbing. Snow falls in forms that vary from flakes, to tiny crystals to coarse pellets, depending on temperature and wind. Once fallen, snow begins to change as it is acted upon by sun, wind, temperature variations, self-compaction, and subsequent precipitation. Even in the course of a day, the snow can change from rock hard in the morning to thigh-sucking slush in the afternoon, and back again by evening.

The ice axe is one of the most versatile and important pieces of mountaineering equipment a climber owns. Without it, safe alpine travel is restricted to easy scrambles. With an axe, and the skill to use it, the climber can venture onto all forms of snow and ice, enjoying a greater variety of mountain landscapes during more seasons of the year.

The modern ice axe is an inherently simple tool with many uses. Below the snow line, it is used for balance, as a walking cane, and to help brake going downhill. But its main role is in snow and ice travel, where it provides balance and a point of security or safety to prevent or arrest a fall. It is also used to chop steps in icy snow for foot holds, and can be used as a brake for a controlled sliding technique known as glissading. Furthermore, it can become a snow anchor when buried in the snow.

The ice axe has several parts: 1) the head, which includes a) the pick, namely a pointed protrusion, and b) the adze, a curved flat scoop extending opposite the pick, 2) the shaft, a rounded or oval tube of various lengths made of aluminum alloy, titanium or a composite material, and 3) the spike, a sharp steel tip on the opposite end of the shaft from the head.

The pick on most ice axes is curved or drooped, a design that provides better hooking action in snow or ice, causing the axe to dig in faster when trying to stop oneself after a fall. A moderate hooking angle of 65 to 70 degrees from the shaft is typical for general mountaineering uses. A sharper angle of 55 to 60 degrees is commonplace for technical ice climbing, as it coincides with the arc followed by the axe head when it is planted in steep ice. Some ice climbing axes permit adjustable bolted pick angles. However, most ice axes are used for snow climbing, and have a moderate hooking angle of 65 to 70 degrees. The head is made of ⅛ to 3/16 steel alloy stamped out before hardening. The adze part of the ice axe is either attached before hardening by welding or simply formed by a quarter turn of the heat-softened head.

The most critical function of the ice axe is a maneuver referred to as self-arrest. Self-arrest is the lifesaving technique of using the ice axe to stop the climber's uncontrolled or accidental slide down a snow slope. If unroped, it offers the only chance to stop the slide. It is the single most important snow-climbing skill. The technique also serves to brace a climber solidly in the snow if he has to hold the fall of a rope-mate. Therefore, a climber's own life and those of fellow climbers could hinge on self-arrest.

In the self-arrest maneuver, the hands hold the axe in a solid grip, one hand with thumb under the adze and fingers over the pick, the other hand on the shaft just above the spike. The pick is pressed into the snow just above the climbers shoulder so that the adze is near the angle formed by the neck and shoulder. The shaft crosses the chest diagonally and is held close to the opposite hip. Gripping the shaft near the end prevents that hand from acting as a pivot around which the spike can swing to jab the thigh. The chest and shoulder are pressed strongly down on the ice-axe shaft. The climber's spine is arched slightly away from the snow. This arch is critical; it places the bulk of the climber's weight on the axe head and on his toes or knees, the points that dig into the snow to force a stop.

A common problem experienced by climbers occurs when a climb is being made along a steep, near vertical surface in soft snow, semi-firm snow or soft crust. If the snow were solidly packed or ice, the climber would simply use the axe in the above manner.

However on this softer type snow the above self arrest technique does not work. The pick head may be sunk into the snow to its fullest extent, and the falling climber continues to accelerate. The narrow pick simply cannot generate enough drag or braking force to slow the person. Even the adze does not have enough area to provide significant braking force. The spike is the only part that can generate enough braking force by being sunk deeply into the snow. However the only safe way to hold this position is in a sitting glissade position which is not considered a safe self arrest position.

The book: Mountaineering, Freedom of the Hills, 5th edition (considered the "bible" of mountaineering) contains an illustration on page 289 indicating that rolling toward the spike for self arrest is incorrect while also stating on that same page under "Variations" that the greatest possible drag from the ice axe on loose snow may be in this position. Thus a danger does exist by losing control on this position. It is for these types of snow that this invention is proposed. Snow conditions vary from hard ice, where even a very sharp pick has difficulty penetrating, to very loose "powder" where an ice axe may not be needed at all to stop a fall. Actually, mountaineers may encounter both in the course of a winter climb along with all types in between.

Another mountain climbing skill performed with the ice axe is self-belay. It is usually performed on gentle to semi-steep slopes with the spike used like a walking cane for control and an anchor point for a slip. On steep slopes, a climber can make a direct assault by chopping the pick into the snow and pulling with the arms while climbing with the legs. (Commonly known as "climbing on all fours"). The pick serves as the anchor point if the legs slip.

Ice climbers use two small ice climbing axes (one in each hand) and crampons on their boots to work their way up a slope "on all fours." Again, this technique does not work on semi-firm snow, soft snow or soft crust, since the narrow pickhead pulls too easily through the snow. This problem is also resolved by this invention.

Two other ice axe functions are enhanced by virtue of the improvement of the present invention. The first is a technique known as glissading. Glissading, as mentioned earlier, is a self-controlled slide down a snow slope, most commonly done in a sitting position (which is its most stable and safe position) wherein the spike is dug into the snow for braking purposes. It is an easy and enjoyable way to descend hard to semifirm snowfields which have enough angle to the slope to slide. This invention provides an additional position for soft or semifirm snow wherein the shovel attachment is employed for braking effect.

The second function improved by virtue of the present invention is that wherein the ice axe is used as a snow anchor. Climbers frequently use snow anchors and pickets for attaching ropes to belay. The ice axe can be buried vertically or horizontally (as a "dead man anchor") in the snow for rope attachment. The present invention enables the ice axe to be used as a snow anchor by burying or sinking the entire unit beneath the snow and attaching a rope to the handle.

A broad-bladed shovel is another utility and safety tool for snow travel. It is the only practical tool available for uncovering an avalanche victim. Shovels are also used for digging snow shelters and leveling off tent platforms, and have been used as a climbing tool to shovel a pathway up a particularly snowy route.

A good snow shovel has a blade large enough to move snow efficiently, and a handle long enough for good leverage but short enough for use in a confined area. Some snow shovels come with a detachable handle or with a blade that locks perpendicular to the handle so it can be used as a trenching tool. For projects such as building snow caves, mountaineers sometimes carry a grain scoop, a broad-bladed shovel that can move a lot of snow.

Mountaineers are extremely conscious of the weight and bulk of equipment that they carry because it represents added effort and encumbrance in climbing. Therefore, the need to carry an extra shafted tool such as a shovel must be weighed against its encumbrance.

Numerous shovel adapters have earlier been disclosed. Various blades have been employed in attempts to extend the versatility of hammers, picks, scrapers and other tools. For example, U.S. Pat. No. 4,475,756 to Reading discloses a Shovel adapter for a geologist's hammer. The blade has a plurality of slots adapted to receive the pick end of the hammer which is secured in place with locking hardware. By virtue of the design of the shovel blade and locking hardware, the adapter cannot be quickly deployed in a configuration that would be useful to climbers.

U.S. Pat. No. 3,334,939 to Bonic discloses a combination snow shovel and ice scraper in which the shovel blade may be locked into place upon the scraper blade. Neither of the aforementioned shovel devices are amenable to use with an ice axe.

U.S. Pat. No. 827,898 to Wiener discloses a shovel blade attachment for a bayonet of a rifle. The shovel can only be disposed in line with the rifle, and employed for digging purposes.

U.S. Pat. No. 3,404,412 to Ryan describes a shovel attachment blade adapted to be disposed in line with the handle of a hatchet.

U.S. Pat. No. 5,345,635 issued to Morgan discloses a shovel attachment for a climber's ice axe. However the shovel attachment can be secured only in a position orthogonal to the shaft of the ice axe, enabling the assembly to be useful as a belaying tool, but not permitting use in a conventional shoveling manner.

It is accordingly an object of the present invention to provide a spade attachment for an ice axe which permits use of the ice axe as a shovel or trenching tool while enhancing its gripping ability in loose snow in self-belaying and self-arresting maneuvers.

It is another object of the present invention to provide a spade attachment of the aforesaid nature which may be quickly and easily deployed and removed.

It is still another object of this invention to provide a spade attachment of the aforesaid nature which is lightweight, durable, and amenable to low cost manufacture.

These objects and other objects and advantages of the invention will be apparent from the following description.

SUMMARY OF THE INVENTION

The above and other beneficial objects and advantages are accomplished in accordance with the present invention by a shovel blade attachment for an ice axe having a handle shaft elongated upon a center axis and a head affixed thereto, said head having an adze extremity and opposed pick extremity, said attachment comprising:

a) a blade of monolithic construction having upper and lower surfaces, opposed side edges, and front and rear edges, whereby the blade is symmetrically configured about a plane that vertically intersects the blade in parallel disposition to said side edges and midway therebetween, and a straight slot centered upon said plane of symmetry and extending from said rear edge toward said front edge, b) a V-shaped securing saddle downwardly directed from said lower surface, and spanning said slot, c) a flat V-shaped receiving pocket disposed upon said upper surface adjacent said rear edge spanning said slot and communicating therewith, and containing an aperture centered upon said plane of symmetry, and d) threaded securement means adapted to penetrate said aperture.

In a preferred embodiment, forward retaining means in the form of a bar is disposed beneath said lower surface forwardly of said saddle and in perpendicularly spanning disposition across said slot. The receiving pocket preferably serves the further purpose of structurally reinforcing the blade adjacent the rear edge where weakness might otherwise be expected because of the presence of the slot. In a further embodiment, the securing saddle is formed as a tab downwardly bent from the blade as a continuous integral extension thereof. The forward retaining means may further be in the form of a tab upwardly bent from the blade as a continuous integral extension thereof. Said front edge is preferably bilaterally forwardly tapered, and said rear edge preferably has a retaining lip downwardly directed from said lower surface.

The present invention further embraces the combination of the aforesaid shovel blade attachment and an ice axe modified in a manner to interact optimally with the shovel blade attachment.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing.

DESCRIPTION OF THE PREFERRED EMBODIMENT

Figure 1:
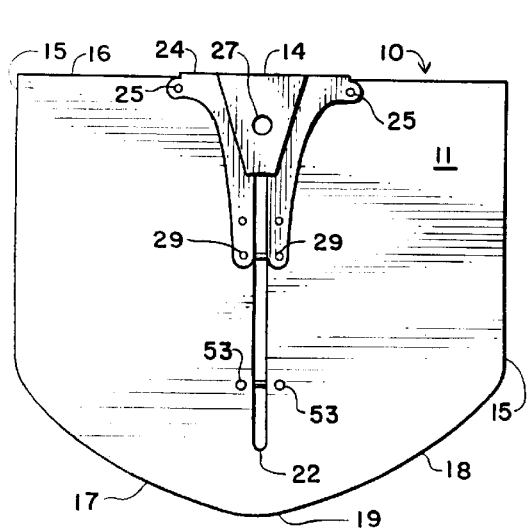
FIG. 1 is a top view of an embodiment of the shovel blade attachment of the present invention.
Figure 2:
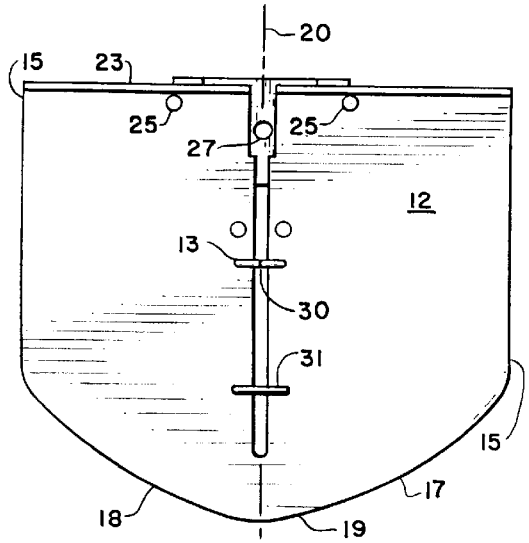
FIG. 2 is a bottom view of the embodiment of FIG. 1.
Figure 3:
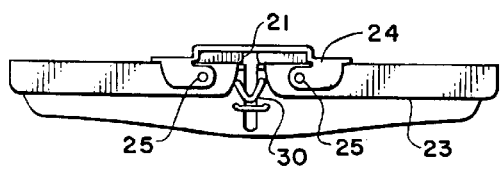
FIG. 3 is a rear view.

Referring to FIGS. 1–6, an embodiment of the shovel blade attachment of the present invention is shown comprised of blade 10 having upper and lower surfaces 11 and 12, respectively, securing saddle 13 downwardly directed from said lower surface, and receiving pocket 14 disposed upon said upper surface.

Blade 10 is bounded by opposed parallel straight side edges 15, rear edge 16, and front edge 17 comprised of diagonal portions 18 which emerge from said side edges and meet in a rounded forward portion 19. Blade 10 is symmetrically configured about plane 20 that vertically intersects the blade in parallel disposition to said side edges and midway therebetween. A straight slot 21 is centered upon said plane of symmetry, extending from rear edge 16 toward forward portion 19, and communicating with said rear edge.

The terminus 22 of slot 21 is located between about 75% and 90% of the length of blade 10, namely the distance between rear edge 16 and forward portion 19. A retaining lip 23 is downwardly directed from rear edge 16 as a continuous integral extension of said blade.

Blade 10 is preferably fabricated of strong, lightweight metal such as aluminum or titanium, and may have a thickness of between about 2 and 4 millimeters, a length between about 8 and 10 inches, and a width measured between said side edges, between about 9 and 11 inches. Said blade is preferably downwardly curved in both the length and width directions, thereby causing lower surface 12 to be concave in the downward direction.

A plate 24 is secured by rivets 25 to upper surface 11 of blade 10, and forms flat V-shaped receiving pocket 14 which spans slot 21 adjacent rear edge 16. An aperture 27 is disposed in pocket 14 and centered upon plane 20. Plate 24, in conjunction with attaching rivets 25, further serves to provide structural reinforcement to the rear portion of blade 10.

V-shaped securing saddle 13 is secured by rivets 29 to blade 10 in a manner causing said saddle to span slot 21 with the apex 30 of said saddle disposed within plane 20. Saddle 13 may be fabricated of metal bar stock. Apex 30 may reside between about 1 and 2 inches below lower surface 12.

Forward retaining means in the form of bar 31 is attached by way of rivets 53 to lower surface 12 forwardly of saddle 13 and in perpendicularly spanning disposition across slot 21.

Ice axe 32 is comprised of handle shaft 33 having a head 34 affixed to one extremity, and spike member 35 affixed to the opposite extremity. Head 34 is comprised of flat base portion 36 in coplanar disposition with shaft 33, said base portion having an adze extremity 37 and opposed pick portion 38 bounded by upper edge 42 and underside 54, and terminating in point 39. Serrated teeth 40 and abutment notch 46 are disposed upon said underside 54. Said adze extremity has an adze blade 41 orthogonally attached to the upper edge 42 of base portion 36, and having a generally triangular shape bounded by substantially straight cutting edge 43 and diagonal side edges 44 convergent toward shaft 33. A threaded hole 45 penetrates blade 41 adjacent the apex formed by edges 44.

Spike member 35 is a flat metal structure of arrow-shaped configuration in coplanar disposition with shaft 33, and defined by convergent edges 47 that meet at a point 48 directed away from said shaft. Said spike member is provided with a conventional rope-receiving opening 49, and threaded hole 50. It is to be noted that both the adze blade and spike member have the same arrow-shaped configuration as defined inpart by convergent edges 44 and 47, respectively. The angle defined by said convergent edges is substantially the same in both the adze blade 41 and spike member 35.

Figure 5:
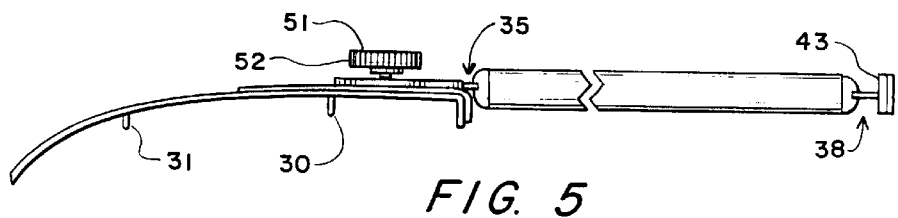
FIG. 5 is a side view of the shovel blade attachment in functional combination with a climber's ice axe to produce a shovel tool.

When the ice axe is brought into engagement with the shovel blade attachment to produce a shovel assembly as shown in FIG. 5, spike member 35 is inserted into pocket 14, causing aperture 27 to align with threaded hole 50. A securing bolt 51, having knurled turning head 52 is then threadably inserted and tightened. By virtue of the embracing effect of pocket 14 and the securing effect of bolt 51, the ice axe is tightly and reliably unified with the shovel blade attachment. In this mode of combination, the unified device may be employed as a shovel for digging purposes.

Figure 4:
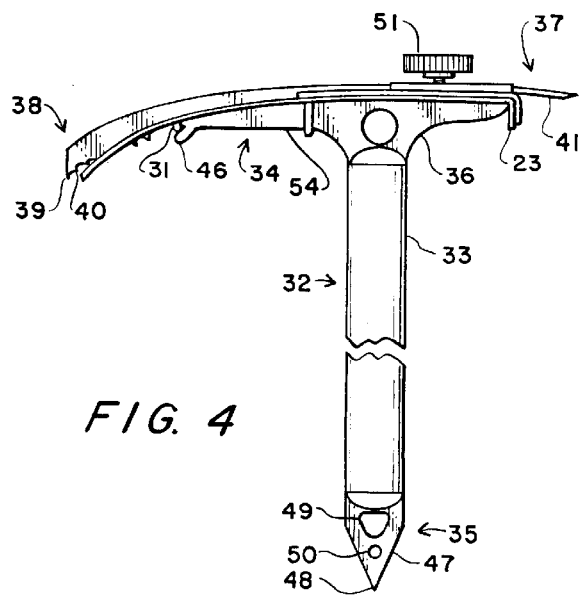
FIG. 4 is a side view of the shovel blade attachment in functional combination with a climber's ice axe to produce a trenching tool.
Figure 6:
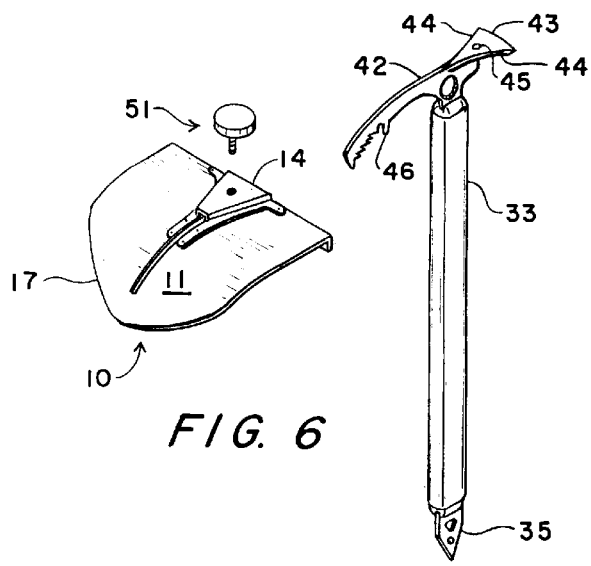
FIG. 6 is an exploded top perspective view of the combination of FIG. 4.

When the ice axe is brought into engagement with the shovel blade attachment to produce a trenching tool assembly, as shown in FIGS. 4 and 6, head 34 is pushed, pick portion first, through slot 21 until abutment notch 46 engages retaining bar 31 and the underside 54 of said pick portion rests within saddle 13. In said state of engagement, a portion of adze blade 41 is seated within pocket 14, and aperture 27 is aligned with hole 45. Securing bolt 51 is then entered through aperture 27 and threadably engaged with hole 45. By virtue of such manner of combination, the ice axe is quickly and securely unified with the shovel blade attachment. The resultant tool can be employed as a trenching tool or for glissading, belaying, anchoring or chopping.

Figure 7:
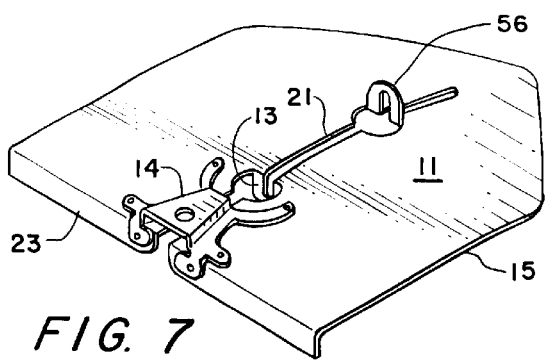
FIG. 7 is a top perspective view of an alternative embodiment of the shovel blade attachment of the present invention.
Figure 8:
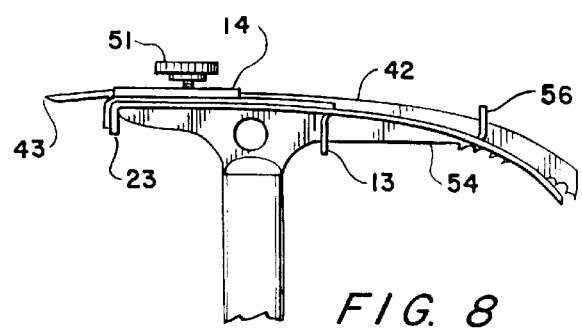
FIG. 8 is a side view of the shovel blade attachment of FIG. 7 shown in functional combination with a climber's ice axe to produce a trenching tool.

In the alternative embodiment illustrated in FIGS. 7 and 8, securing saddle 13 is formed as a tab downwardly bent from the blade as a continuous integral extension thereof. The forward retaining means is in the form of a tab 56 upwardly bent from the blade as a continuous integral extension thereof. Whereas the retaining bar 31 of the embodiment of FIGS. 1–6 contacts the underside 54 of pick portion 38, tab 56 is adapted to abut upper edge 42 of the head of the ice axe.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. A shovel blade attachment for an ice axe having a handle shaft elongated upon a center axis, a head affixed to one extremity of said shaft and having a bilaterally tapered adze extremity and opposed pick extremity, and a V-shaped spike affixed to the opposite extremity of said shaft, said attachment comprising:

a) a blade having upper and lower surfaces, opposed side edges, and front and rear edges, whereby the blade is symmetrically configured about a plane that vertically bisects the blade in parallel disposition to said side edges and midway therebetween, said blade having a straight slot centered upon said plane of symmetry, b) a V-shaped receiving pocket configured to receive at least a portion of said adze extremity, said receiving pocket being disposed upon said upper surface adjacent said rear edge in communication with said slot, and containing an aperture centered upon said plane of symmetry, and c) threaded securement means adapted to penetrate said aperture and secure said adze extremity.

2. The blade attachment of claim 1 wherein said receiving pocket is substantially V-shaped and contoured and sized to receive said spike.

3. The blade attachment of claim 1 having a curvature between said front and rear edges causing said upper surface to be upwardly convex.

4. The blade attachment of claim 3 wherein said front edge is forwardly pointed.

5. The blade attachment of claim 4 of monolithic metal construction.

6. The blade attachment of claim 1 further comprising a securing saddle downwardly directed from said lower surface, and spanning said slot.

7. The blade attachment of claim 6 further comprising forward retaining means located between said securing saddle and front edge, and spanning said slot.

8. In combination, the blade attachment of claim 1 and an ice axe having a handle shaft elongated upon a center axis, a head affixed to one extremity of said shaft and having an adze extremity and opposed pick extremity, and a V-shaped flat spike affixed to the opposite extremity of said shaft, said adze extremity and spike each having a threaded hole positioned so as to align with said aperture when said ice axe is brought into selective engagement with said blade attachment.

9. The combination of claim 8 wherein the engagement of said blade attachment with said ice axe is such that said head partially penetrates said slot with said pick extremity directed toward said front edge, said adze extremity enters said receiving pocket, and said securement means penetrates said aperture and engages said threaded hole, whereby said combination assumes a configuration useful as a trenching tool.

* * * * *